US007567577B2

(12) United States Patent
Thubert et al.

(10) Patent No.: US 7,567,577 B2
(45) Date of Patent: Jul. 28, 2009

(54) LINK STATE ADVERTISEMENTS SPECIFYING DYNAMIC ROUTING METRICS AND ASSOCIATED VARIATION METRICS AND SELECTIVE DISTRIBUTION THEREOF

(75) Inventors: Pascal Thubert, La Colle sur Loup (FR); Vincent Jean Ribiere, Biot (FR); Eric M. Levy-Abegnoli, Valbonne (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 11/167,239

(22) Filed: Jun. 28, 2005

(65) Prior Publication Data

US 2006/0291485 A1 Dec. 28, 2006

(51) Int. Cl.
*H04L 12/56* (2006.01)
(52) U.S. Cl. .................. 370/401; 370/410; 709/238; 709/239; 709/242
(58) Field of Classification Search .......... 370/401; 709/238
See application file for complete search history.

(56) References Cited

U.S. PATENT DOCUMENTS

| 2004/0059830 | A1* | 3/2004 | Brown .................. 709/238 |
| 2004/0087304 | A1* | 5/2004 | Buddhikot et al. ....... 455/426.2 |
| 2006/0010249 | A1* | 1/2006 | Sabesan et al. ............ 709/238 |

OTHER PUBLICATIONS

Baker, "An outsider's view of MANET" <draft-baker-manet-review-01> Network Working Group Internet Draft, Mar. 17, 2002.

Moy, "OSPF Version 2", Network Working Group Request for Comments: 2328, Apr. 1998.

Perkins et al., "Ad hoc On-Demand Distance Vector (AODV) Routing" <draft-ietf-manet-aodv-13.txt> Mobile Ad Hoc Networking Working Group Internet Draft, Feb. 17, 2003.

Johnson et al., "The Dynamic Source Routing Protocol" <draft-ietf-manet-dsr-09.txt> IETF MANET Working Group Internet Draft, Apr. 15, 2003.

Garcia-Luna et al., "Source Tree Adaptive Routing (Star) Protocol" <draft-ietf-manet-star-00.txt> IETF MANET Working Group Internet Draft, Oct. 22, 1999.

(Continued)

*Primary Examiner*—Chirag G Shah
*Assistant Examiner*—Salvador E Rivas
(74) *Attorney, Agent, or Firm*—Leon R. Turkevich

(57) ABSTRACT

Each router in a network is configured for executing a link state routing protocol based on outputting a corresponding first link state advertisement message describing a connected link of the router and that specifies a first dynamic routing metric identifying a first cost of the connected link, and a corresponding variation metric identifying a statistical variation of the dynamic routing metric. Each router also is configured for selectively outputting a corresponding second link state advertisement message describing the connected link and that specifies the corresponding variation metric and an updated dynamic routing metric identifying an updated cost of the connected link relative to the first cost, the second link state advertisement message selectively output based on the updated dynamic routing metric differing from the first dynamic routing metric by more than the variation metric, or the router having received another link state advertisement from another router in the network.

40 Claims, 3 Drawing Sheets

OTHER PUBLICATIONS

Clausen et al., "Optimized Link State Routing Protocol (OLSR)", Network Working Group Request for Comments: 3626, Oct. 2003.

Chen et al., "A New Approach to Routing with Dynamic Metrics", Proceedings IEEE INFOCOM '99, The Conference on Computer Communications, Eighteenth Annual Joint Conference of the IEEE Computer and Communications Societies, The Future Is Now, Mar. 21-25, 1999, New York, NY, USA. IEEE, 1999, ISBN 0-7803-5417-6, vol. 2, pp. 661-670.

Coltun et al., "OSPF for IPv6", Network Working Group Request for Comments: 2740, Dec. 1999.

Sanzgiri et al., "Delay-based Routing with OSPF" (unpublished), May 16, 2003, 13 pages.

* cited by examiner

LINK STATE ADVERTISEMENTS SPECIFYING DYNAMIC ROUTING METRICS AND ASSOCIATED VARIATION METRICS AND SELECTIVE DISTRIBUTION THEREOF

BACKGROUND OF THE INVENTION

1. Field of the Invention

The present invention relates to link state routing protocols for establishment and maintenance of routes by routers in a network; more specifically, the present invention relates to distribution of dynamic routing metrics among routers of a network (e.g., a mobile ad hoc network or a mesh network) according to a link state routing protocol, optimized for minimal overhead while accommodating rapid topology changes in the network.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has a Mobile Ad-hoc Networks (MANET) Working Group that is working to develop standardized MANET routing specification(s) for adoption by the IETF. According to the MANET Working Group, a "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET"(Mar. 17, 2002), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

Existing MANET protocols focus on the internal connectivity within the unstable topology between mobile devices; however, the existing MANET protocols suffer from the disadvantage that they provide a poor model for connecting to a wide area network such as the Internet.

MANET protocols can be divided into the following types: stateful (proactive); and stateless (reactive). Proactive MANET protocols distribute routing information throughout the MANET network, enabling the routers within the MANET network to store route information before a data packet needs to be routed; hence, a router determines how to forward a packet based on accessing routing information from an internal table. However, proactive protocols suffer the disadvantage of requiring update messages to update obsolete route entries: the necessity for update messages increases with a corresponding desire for an improvement in route optimization.

Proactive MANET protocols can be subdivided into two subtypes, or "families": Optimized Routing Approach (ORA), and Least Overhead Routing Approach (LORA). The ORA type protocols are similar to routing protocols used in the Internet, in that they stress maintaining the best states to maintain the shortest path routes, at the expense of requiring more control messages to exchange routes. An example of an ORA type routing protocol is Open Shortest Path First (OSPF) (as specified by the IETF Request for Comments (RFC) 2328), or Intermediate System-to-Intermediate System (IS-IS) protocol (specified by the International Organization for Standardization document ISO 10589). However, the OSPF and IS-IS protocols suffer from the disadvantage that they may require up to a minute to converge (i.e., complete protocol communications necessary to establish a connection) and hence may not be able to converge quickly enough for a mobile router that is moving from one location to another. For example, in the case of two vehicles passing each other, each having a mobile router, there may exist approximately ten seconds for the mobile routers to establish a connection; hence, routing protocols requiring up to a minute to converge would be unable to establish a connection. Also note that OSPF requires link-state advertisements (LSAs) to be refreshed as they expire after 3600 sec, resulting in substantial burdens in distributing the LSAs.

Reactive protocols were developed to address the slow convergence of ORA type proactive protocols, where routing information is acquired only when needed. Examples of reactive protocols are described in an Internet Draft by Perkins et al., "Ad hoc On-Demand Distance Vector (AODV) Routing (draft-ietf-manet-aodv.13), Feb. 17, 2003, and an Internet Draft by Johnson et al., "The Dynamic Source Routing Protocol for Mobile Ad Hoc Networks (DSR)<draft-ietf-manet-dsr-09.txt>", Apr. 15, 2003. Reactive protocols require less bandwidth than proactive protocols, but the latency for many applications will increase substantially, resulting in long delays. Such delays become quite apparent if a mobile user attempts to execute a bandwidth-intensive application on the ad hoc network instead of a typical high-speed wired connection on the Internet using a conventional connection (e.g., hard-wired LAN, cable modem, etc.).

The LORA family of proactive protocols attempts to provide a compromise between the fully stateful (ORA family) protocols and the fully stateless (reactive) protocols. One example of a LORA-type protocol is described in an Internet Draft by Garcia-Luna-Aceves, et al., "Source Tree Adaptive Routing (STAR) Protocol <draft-ietf-manet-star.00.txt>", Oct. 22, 1999. However, even the disclosed STAR protocol suffers from disadvantages of requiring routing messages to establish a stable topology within the MANET network. For example, the STAR protocol requires a router to transmit the parameters of its source routing tree, including each link that the router needs to reach every known destination (and address range) in the ad hoc network or Internet. Although the STAR router attempts to conserve transmission bandwidth and energy by sending changes to its source routing tree only when the router detects new destinations, the possibility of looping, or the possibility of node failures or network partitions, the necessity of transmitting such parameters for each and every link still imposes substantial messaging requirements that affects bandwidth availability and network convergence times.

Efforts have been made to improve the performance of link state routing computations, also referred to Shortest Path First (SPF) based computations, based on using dynamic routing metrics instead of static metrics. In particular, OSPF has been based on a router using LSAs to flood the network with the assigned costs of the respective links utilized by the router, enabling other routers to calculate shortest routes to destinations. Use of dynamic routing metrics (e.g., early attempts at using dynamic routing metrics (e.g., in ARPANET) were unsuccessful because the dynamic routing metrics tended to introduce instabilities due to oscillation in the link delay values: routers receiving an advertisement of a dynamic routing metric (e.g., a low link delay value in a delay-based routing protocol) would immediately reconfigure their routes to use the advertised low delay link, creating substantially higher traffic on the advertised link; routers would then reroute their paths around the advertised link that had become a high delay link, causing the router to advertise the advertised link again as a low delay link. Such oscillation in the dynamic routing metrics caused routing instability.

Recent efforts to use dynamic routing metrics in link state routing protocols have attempted to reduce oscillation and instability by limiting the transmission of LSAs specifying the dynamic routing metrics: an LSA is output only if the dynamic routing metric specified in the LSA (e.g., link cost) changes by a multiple of a fixed value, also referred to as a "cost bucket"; hence, the router outputs an updated link cost value in an LSA only if the updated link cost value is deemed to have "moved" from one cost bucket to another; further, any link cost value that is near a boundary between two cost buckets must pass beyond a hysteresis range (e.g., 20%) before being moved to the new bucket. Although such attempts limit the number of shortest path first (SPF) computations that are performed by the routers and the associated instability, such attempts also adversely reduce the responsiveness of the network to changes in the dynamic routing metrics.

SUMMARY OF THE INVENTION

There is a need for an arrangement that enables a network, having routers employing link state routing protocols that determine routes based on transmission and reception of dynamic routing metrics, to respond in an effective manner to changes in the dynamic routing metrics without introducing instability into the determination of the routes.

There also is an arrangement that enables a network router, employing a link state routing protocol in a network, to advertise an updated dynamic routing metric having changed relative to a prior-advertised dynamic routing metric without introducing instability into the network, where the updated dynamic routing metric is advertised without the necessity of a substantial difference between the updated dynamic routing metric and the prior-advertised dynamic routing metric.

These and other needs are attained by the present invention, where each router in a network is configured for executing a prescribed link state routing protocol based on outputting a corresponding first link state advertisement message describing a connected link of the router and that specifies a first dynamic routing metric that identifies a first cost of the connected link, and a corresponding variation metric that identifies a statistical variation of the dynamic routing metric. Each router also is configured for selectively outputting a corresponding second link state advertisement message describing the connected link and that specifies the corresponding variation metric and an updated dynamic routing metric identifying an updated cost of the connected link relative to the first cost, the second link state advertisement message selectively output based on either: the updated dynamic routing metric differing from the first dynamic routing metric by more than the variation metric; or the router having received a third link state advertisement from another router in the network.

Hence, a flooding of link state advertisement messages throughout the network for recalculation of routes according to the link state routing protocol occurs only when at least one of the routers outputs a "primary" link state advertisement message specifying a dynamic routing metric having a detected change that exceeds the corresponding variation metric (i.e., "a substantially changed dynamic routing metric"), at which point all other routers receiving any link state advertisement message (e.g., the primary link state advertisement message) synchronize their advertised link states by outputting respective "secondary" link state advertisement messages specifying any dynamic routing metrics that do not exceed their respective variation metrics (i.e., "insubstantially changed dynamic routing metrics"). In other words, the transmission of the primary link state advertisement message (specifying the substantially changed dynamic routing metric and the corresponding variation metric) from a router in the network will require recalculation of routes throughout the network, hence the flooding of the network by the remaining routers with their respective secondary link state advertisement messages (specifying the respective insubstantially changed dynamic routing metrics and respective variation metrics), will not introduce any additional instability within the network during the required recalculation of routes.

Hence, primary link state advertisement messages are output as needed to ensure responsiveness to network changes, while preventing instability by limiting distribution of any secondary link state advertisement messages to instances where recalculation of routes already is required based on the transmission of the primary link state advertisement message.

One aspect of the present invention provides a method in a router configured for executing a prescribed link state routing protocol. The method includes originating and outputting by the router a first link state advertisement message describing a connected link of the router in a network, the first link state advertisement message specifying a first dynamic routing metric and a corresponding variation metric identifying a statistical variation of the dynamic routing metric, the first dynamic routing metric identifying a first cost of the connected link. The method also includes selectively originating and outputting a second link state advertisement message describing the connected link and that specifies an updated dynamic routing metric and the corresponding variation metric. The updated dynamic routing metric identifies an updated cost of the connected link relative to the first cost. The second link state advertisement message is selectively output by the router in response to one of: (1) the updated dynamic routing metric differing from the first dynamic routing metric by more than the variation metric, and (2) the router having received another link state advertisement message from another router in the network. The selective output of the second link state advertisement message ensures that the updated dynamic routing metric is output when route recalculation is required according to the prescribed link state routing protocol, namely based on the difference exceeding the variation metric, or reception of another link state advertisement message that already triggers the route recalculation. Hence, the dynamic routing metrics are distributed without introducing instability into the network.

Another aspect of the present invention provides a router in a network. The router includes multiple network interfaces, and a routing resource. Each network interface is configured for outputting, via a corresponding connected link, first and second link state advertisement messages having been generated by the router. At least one of the network interfaces is configured for receiving a third link state advertisement message from another router in the network. The routing resource is configured for executing a prescribed link state routing protocol, and is further configured for originating and supplying, to the network interfaces, the first link state advertisement message describing a corresponding one of the connected links and specifying a first dynamic routing metric and a corresponding variation metric identifying a statistical variation of the dynamic routing metric. The first dynamic routing metric identifies a first cost of the corresponding one connected link. The routing resource further is configured for selectively originating and outputting, to the network interfaces, a second link state advertisement message describing the corresponding one connected link and that specifies an updated dynamic routing metric and the corresponding variation metric, the updated dynamic routing metric identifying an updated cost of the corresponding one connected link relative to the first cost, the second link state advertisement message selectively generated by the routing resource in response to one of: (1) the routing resource having determined that the updated dynamic routing metric differs from the first dynamic routing metric by more than the variation metric, and (2) the routing resource having received the third link state advertisement message.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
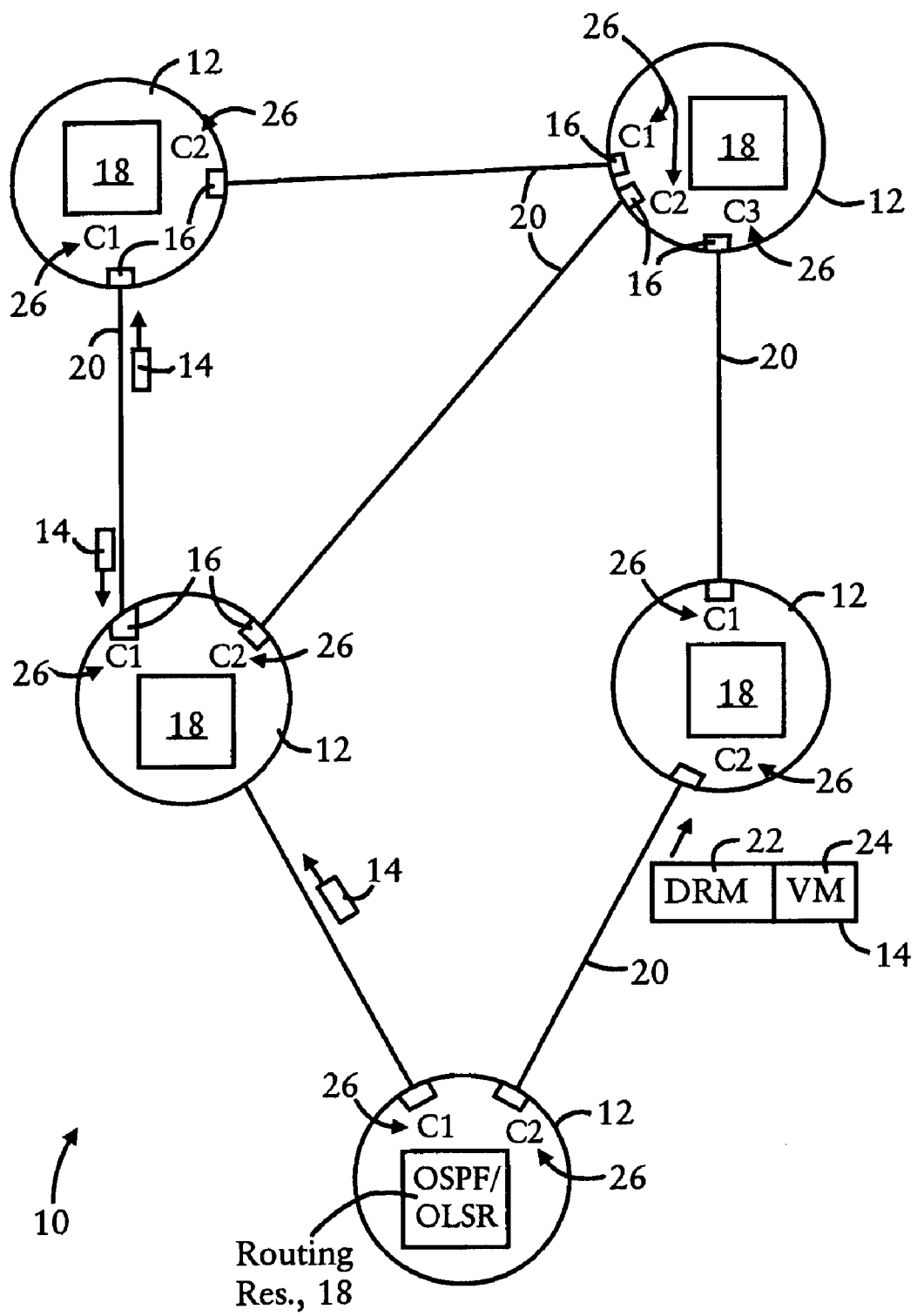
FIG. 1 is a diagram illustrating a network having routers configured for selective output of link state advertisement messages, specifying dynamic routing metrics and variation metrics, according to an embodiment of the present invention.

FIG. 1 is a diagram illustrating a network 10 having routers 12 configured for establishing and maintaining routes between each other based on distribution of link state advertisement messages 14, according to an embodiment of the present invention. Each router 12 includes a plurality of network interfaces 16, and a routing resource 18. Each network interface 16 is configured for sending and receiving data packets, including link state advertisement messages 14, via a connected link 20 to and from a connected router 12.

As recognized in the art, the routing resource 18 in each router 12 is configured for executing a prescribed link state routing protocol, for example OSPFv2 according to RFC 2328 or Optimized Link State Routing Protocol (OLSR) according to RFC 3626, based on exchanging the link state advertisement messages 14 with adjacent routers 12, where each link state advertisement message 14 describes one of the connected links 20 of the router 12 in terms of an associated cost (e.g., "C1") 26. Conventional implementations of link state routing protocols such as OSPFv2 and OLSR have assumed that the static cost (e.g., "C1") 26 of a connected link 26 at a given instant in time should be distributed to the other routers 12 as the relevant cost metric for the corresponding connected link 20. Use of a static cost metric introduces instability problems and does not provide an accurate assessment of the overall performance of the corresponding connected link 20.

In addition, prior attempts at describing a connected link 20 in terms of a dynamic metric do not contemplate that estimation of network performance is best determined by an assessment of data performance parameters (e.g., cost values 26) having been sampled over a large sampling window; hence, the most appropriate methodology for characterizing performance (or cost) of a connected link 20 is to provide a statistical analysis of the cost 26 of a connected link 20. The precise evaluation of the cost 26 of a connected link 20 requires not only a first dynamic metric that evaluates the cost 26 over a distribution window that enables sampling a statistically significant number of cost values 26 for the corresponding link, but also a second dynamic metric that evaluates the "quality" (i.e., stability) of the first dynamic metric. In other words, the second dynamic metric is needed to provide information that enables an assessment of the stability of the first dynamic metric.

As described below in detail with respect to FIG. 2, each of the link state advertisement messages 14 according to the disclosed embodiment specify a dynamic routing metric (DRM) 22 and a corresponding variation metric (VM) 24. The dynamic routing metric 22 represents a statistical normalization of the cost (e.g., "C1") in using the corresponding connected link 20, where the statistical normalization is obtained based on obtaining multiple samples of the value of the associated cost 26 over a prescribed distribution window. The variation metric 24 identifies the statistical variation of the dynamic routing metric 22. Hence, the variation metric 24 identifies whether the associated dynamic routing metric 22 is relatively stable, based on having a relatively small percent variation or a small standard of deviation value, or whether the dynamic routing metric 22 is unstable or trending toward a higher or lower end of the distribution of sampled values based on a relatively high percent of variation or a high standard of deviation value.

Hence, the disclosed embodiment changes the way that metrics are used by the routers 12 in performing link state routing computations for determining an optimum path for a packet. Each router is configured for performing link state routing computations, where each router 12 selects a given path based on the corresponding dynamic routing metric 22, and the corresponding variation metric 24 that evaluates the stability of the dynamic routing metric 22. Although path selection could be based solely on path cost as is well known, a more conservative approach is to choose the worst case scenario to the cost analysis for each possible path, for example using the dynamic routing metric 22 plus the variation metric 24 for each leg of the path, and select the path having the least cost in terms of the dynamic routing metric 22 and the variation metric 24.

Figure 2:
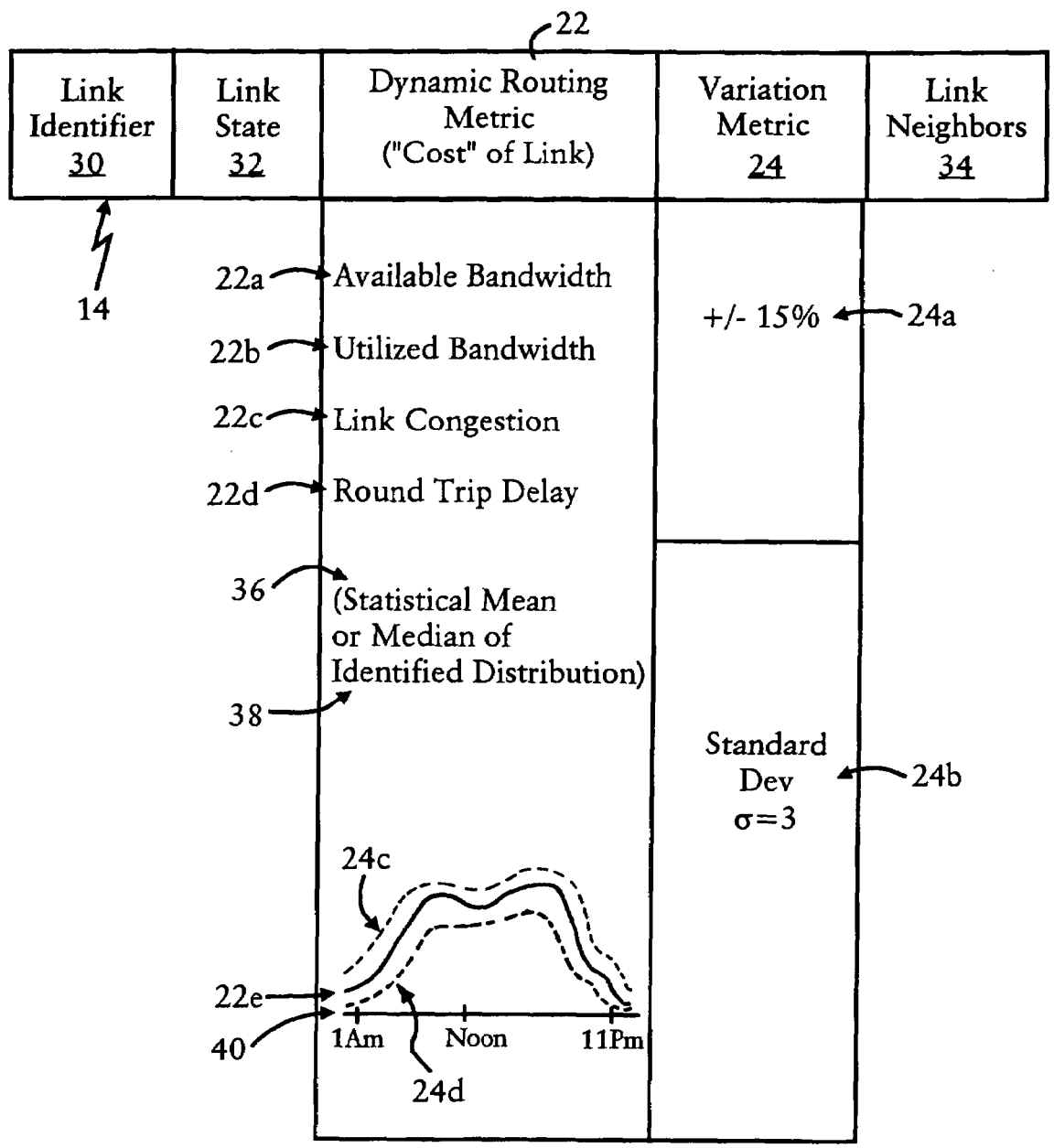
FIG. 2 is a diagram illustrating in further detail a link state advertisement message, according to an embodiment of the present invention.

FIG. 2 is a diagram illustrating in further detail a link state advertisement message 14, and various available implementations of the dynamic routing metric 22 and the variation metric 24, according to an embodiment of the present invention. The link state advertisement message 14, generated by the routing resource 18 of FIG. 1, describes a connected link 20 of the associated router 12 in the network 10 based on including a link identifier 30 that identifies the connected link 20, a link state field 32 that may be used to identify the state of the link 20 (e.g., active, idle, congested, unavailable, etc.), the dynamic routing metric field 22, the variation metric field 24, and a link neighbor field 34 that may be used to identify adjacent connected routers 12. Additional details related to the fields 30, 32, and 34 may be obtained from the above-identified RFC 2328 and 3626.

As illustrated in FIG. 2, the routing resource 18 may implement the dynamic routing metric 22 using a statistical normalization of the cost 26 based on utilizing either a statistical mean 36 ("average") of the sampled costs over the sampling window (i.e., distribution window), or a statistical median 38 ("midpoint") of the identified distribution. The routing resource 18 also may utilize various dimensions of cost 26 in calculating the dynamic routing metric 22, for example a dynamic routing metric 22 expressed in terms of available bandwidth 22a, utilized bandwidth 22b, link congestion 22c, or round-trip delay 22d.

The routing resource 18 also may implement the variation metric 24 in terms of a percentage deviation 24a or a standard deviation ($\sigma$) 24b, where the standard deviation ($\sigma$) 24b is defined as the square root of the variance, or the root mean square (RMS) deviation from the average 36. It will be appreciated that other implementations of the variation metric 24 may be utilized, as desired.

In addition, the dynamic routing metric 22 and the variation metric 24 may be expressed as dependent values that vary relative to an independent variable 40 (e.g., time of day), such that the statistical normalization 22 provides a graph 22e of the distribution relative to the independent variable 40, and the variation metric 24 provides bounded regions 24c, 24d for the graph 22e relative to the independent variable 40.

Hence, use of dynamic routing metrics 22e and variation metrics 24c and 24d expressed as a graph relative to an independent variable 40 is particularly effective in enabling routers to calculate optimum paths relative to the independent variable 40: in the example of the independent variable 40 representing time of day and the dynamic routing metric 22e representing average utilized bandwidth during the day, the routing resources 18 can continually calculate their optimum paths relative to the independent variable (e.g., time of day) 40, eliminating the necessity of repeated link state advertisement messages 40 based on a static change in the utilized bandwidth.

Figure 3:
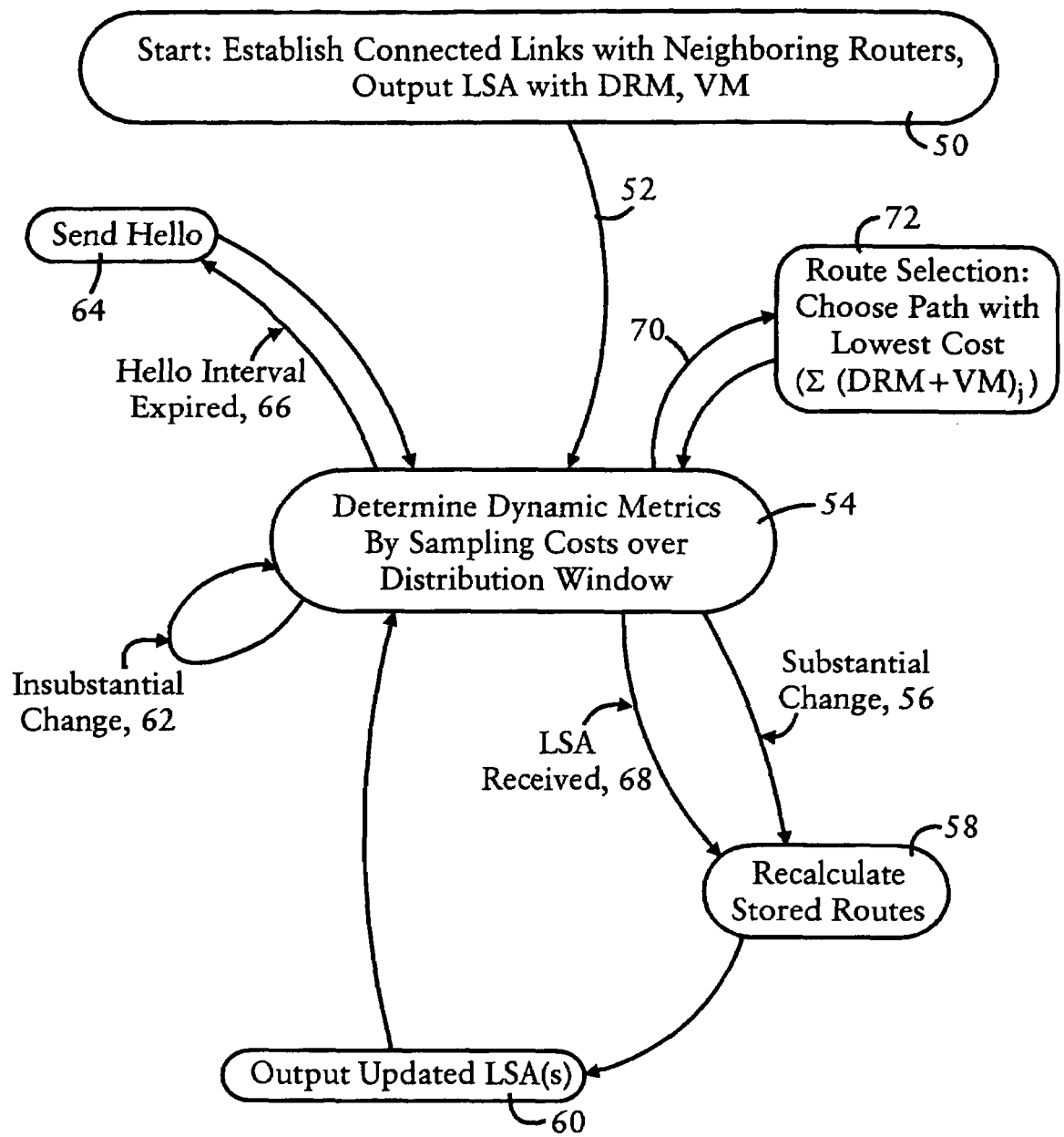
FIG. 3 is a state diagram illustrating the method by the routing resource of FIG. 1 of selectively outputting link state advertisement messages specifying dynamic routing metrics and variation metrics, according to an embodiment of the present invention.

FIG. 3 is a state diagram illustrating the method by each routing resource 18 of FIG. 1 of selectively outputting the link state advertisement messages 14 specifying dynamic routing metrics 22 and variation metrics 24, according to an embodiment of the present invention. The steps described in FIG. 3 can be implemented as executable code stored on a computer readable medium (e.g., a hard disk drive, a floppy drive, a random access memory, a read only memory, an EPROM, a compact disk, etc.)

The method begins in step 50, wherein the routing resource 18 establishes the connected links 20 with neighboring routers 12, updates its internal link state database (not shown) based on any received link state advertisement messages 14, and outputs at event 52 its initial link state advertisement message 14 specifying the first dynamic routing metric 22 and the corresponding variation metric 24. In addition, the routing resource 18 stores in step 50 in its internal link state database (not shown) for each connected link 20 the corresponding dynamic routing metric 22 and valuation metric 24 having been advertised in a transmitted link state advertisement message 14. It will be appreciated that upon initialization, the initial dynamic routing metric 22 may have a limited number of sampling points; as will become apparent, however, as the network stabilizes, the number of required link state advertisement messages 14 is dramatically reduced.

The routing resource 18 enters a dynamic metric monitoring state 54, where the routing resource 18 generates an updated dynamic routing metric based on sampling the corresponding cost 26 of the corresponding connected link 20 over a prescribed distribution window (e.g., 1000 samples).

The routing resource 18 then determines whether the updated dynamic routing metric has encountered a substantial change relative to the stored dynamic routing metric 22 stored in the internal link state database. In particular, if the routing resource 18 determines in the state 54 that the updated dynamic routing metric calculated in step 54 has a difference (relative to the stored dynamic routing metric 22) that exceeds the corresponding variation metric 24, the routing resource 18 determines that a substantial change event 56 has occurred that requires recalculation of the routes in the internal link state database in state 58, and originating and outputting in state 60 an updated link state advertisement message 14 that specifies the updated dynamic routing metric 22 and the corresponding variation metric 24. As apparent from the foregoing, the variation metric may be configured as a "static" value (i.e., as having a manually-defined range), or may be implemented as a dynamic value having a calculated standard deviation value 24b as illustrated in FIG. 2. The routing resource 18 returns to the state 54 following output of the updated link state advertisement message in step 60.

As described above, the distribution of link state advertisement messages 14 is minimized in order to ensure that instability is not introduced into the network. As described above with respect to steps 54, 56, 58, and 60, since each link 20 is characterized by its dynamic routing metric 22 and the corresponding variation metric 24, the routing resource 18 can easily determine whether the advertised dynamic routing metric 22 to other routers 12 is no longer valid based on whether the existing dynamic routing metric 22 exceeds the previously-advertised dynamic routing metric stored in the link state database by at least the advertised variation metric 24.

If in step 54 the existing dynamic routing metric is within the range specified by the variation metric 24, there is no need to disrupt the network by unnecessarily generating a link state advertisement message 14, and the dynamic routing metric 22 is deemed to have encountered an insubstantial change at event 62. Hence, there is no need to output a link state advertisement message 14 that would force recalculation of routes so long as the difference between the updated dynamic routing metric and the dynamic routing metric stored in the link state database is within the bounds of the variation metric 24. Rather, the routing resource 18 can simply output periodic hello messages at step 64 in response to expiration of a prescribed time interval at step 66.

However, reception of a link state advertisement message 14 from another router 12 at event 68 indicates that the stored routes need to be recalculated; hence, since the calculation of the stored routes will require a prescribed time interval, any insubstantial changes in the dynamic routing metrics also can be advertised to the other routers within the recalculation time interval, enabling the dynamic routing metrics 22 to be synchronized throughout the network 10. Hence, the routing resource recalculates its routes in step 58 in response to the received link state advertisement message 14, and floods its interfaces 16 with the updated routing metrics 22 and variation metrics for its connected links 20, regardless of whether the changes in the updated routing metrics 22 are insubstantial (i.e., within the bounds of the variation metrics).

The routing resource 18 can then perform route selection, in response to a received packet at event 70, to select in step 72 the path having the least cost based on a summation of the dynamic routing metric (DRM) 22 plus the variation metric (VM) 24 for each leg of the path according to Dijkstra's Shortest Path First (SPF) algorithm (expressed in step 72 in simplified form as $\Sigma(DRM+VM)_j$). Adding the DRM metric 22 with the VM 24 is but one example of using both metrics to compute the best path.

According to the disclosed embodiment, link state advertisement messages specifying dynamic routing metrics and variation metrics are output as needed to provide a precise estimation of performance of connected links. Initiation of route recalculation caused by initiating outputting of link state advertisement messages is executed only when the prior messages are no longer valid, based on the updated dynamic routing metric differing from the prior dynamic routing metric by at least the variation metric. However, reception of a link state advertisement message from another router enables the routing resource to synchronize its routing metrics during an existing route recalculation, with no loss of stability in the network. Hence, the minimal transmission of link state advertisement messages is particularly beneficial for MANET or mesh networks that encounter substantial link changes but that require rapid convergence times and minimal overhead traffic on their wireless links.

It will be appreciated that various network-based performance metrics may be used in implementing the link state routing protocol, and different statistical parameters and operations may be employed to implement the dynamic routing metric and variation metric.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a router configured for executing a prescribed link state routing protocol, the method including:

originating and outputting by the router a first link state advertisement message describing a connected link of the router in a network, the first link state advertisement message specifying a first dynamic routing metric and a corresponding variation metric identifying a statistical variation of the first dynamic routing metric, the first dynamic routing metric identifying a first cost of the connected link;

selectively originating and outputting a second link state advertisement message describing the connected link and that specifies an updated dynamic routing metric and the corresponding variation metric, the updated dynamic routing metric identifying an updated cost of the connected link relative to the first cost, the second link state advertisement message selectively output by the router in response to one of:

(1) the updated dynamic routing metric differing from the first dynamic routing metric by more than the variation metric, or (2) the router having received another link state advertisement message from another router in the network.

2. The method of claim 1, wherein the first dynamic routing metric and the updated dynamic routing metric specify a corresponding statistical normalization of the first cost and the updated cost, respectively.

3. The method of claim 2, wherein the first cost and the updated cost identify at least one of available bandwidth, utilized bandwidth, link congestion, or round trip link delay.

4. The method of claim 2, wherein the statistical normalization is one of a mean or a median of the corresponding cost relative to a prescribed distribution.

5. The method of claim 4, wherein the statistical normalization is based on an independent variable within the network, the statistical normalization providing a graph of the prescribed distribution relative to the independent variable.

6. The method of claim 5, wherein the variation metric specifies one of a percentage deviation or a standard deviation value relative to the statistical normalization.

7. The method of claim 1, wherein the selectively outputting includes outputting the second link state advertisement message only in response to said one of (1) the updated dynamic routing metric differing from the first dynamic routing metric by more than the variation metric, or (2) the router having received another link state advertisement message from another router in the network, the method further comprising:

periodically outputting a hello message to the another router; and recalculating stored routes in response to the another link state advertisement message.

8. The method of claim 1, further comprising selecting a path for a received packet based on a cost value derived from the updated dynamic routing metric and the corresponding variation metric.

9. A router in a network, the router comprising:

a plurality of network interfaces, each configured for outputting, via a corresponding connected link, first and second link state advertisement messages having been generated by the router, at least one of the network interfaces configured for receiving a third link state advertisement message from another router in the network; and a routing resource configured for executing a prescribed link state routing protocol, the routing resource configured for originating and supplying, to the network interfaces, the first link state advertisement message describing a corresponding one of the connected links and specifying a first dynamic routing metric and a corresponding variation metric identifying a statistical variation of the first dynamic routing metric, the first dynamic routing metric identifying a first cost of the corresponding one connected link;

the routing resource further configured for selectively originating and outputting, to the network interfaces, a second link state advertisement message describing the corresponding one connected link and that specifies an updated dynamic routing metric and the corresponding variation metric, the updated dynamic routing metric identifying an updated cost of the corresponding one connected link relative to the first cost, the second link state advertisement message selectively generated by the routing resource in response to one of: (1) the routing resource having determined that the updated dynamic routing metric differs from the first dynamic routing metric by more than the variation metric, or (2) the routing resource having received the third link state advertisement message.

10. The router of claim 9, wherein the first dynamic routing metric and the updated dynamic routing metric specify a corresponding statistical normalization of the first cost and the updated cost, respectively.

11. The router of claim 10, wherein the first cost and the updated cost identify at least one of available bandwidth, utilized bandwidth, link congestion, or round trip link delay.

12. The router of claim 10, wherein the statistical normalization is one of a mean or a median of the corresponding cost relative to a prescribed distribution.

13. The router of claim 12, wherein the statistical normalization is based on an independent variable within the network, the statistical normalization providing a graph of the prescribed distribution relative to the independent variable.

14. The router of claim 13, wherein the variation metric specifies one of a percentage deviation or a standard deviation value relative to the statistical normalization.

15. The router of claim 9, wherein the routing resource is configured for selectively outputting the second link state advertisement message only in response to said one of (1) the updated dynamic routing metric differing from the first dynamic routing metric by more than the variation metric, or (2) the router having received another link state advertisement message from another router in the network, the routing resource further configured for:
periodically outputting a hello message to the another router; and
recalculating stored routes in response to the third link state advertisement message.

16. The router of claim 9, wherein the routing resource is configured for selecting a path for a received packet based on a cost value derived from the updated dynamic routing metric and the corresponding variation metric.

17. A network comprising:
a plurality of routers, each router comprising:
(1) a plurality of network interfaces, each configured for outputting, via a corresponding connected link, first and second link state advertisement messages having been generated by the router, at least one of the network interfaces configured for receiving a third link state advertisement message from another one of the routers in the network; and
(2) a routing resource configured for executing a prescribed link state routing protocol, the routing resource configured for originating and supplying, to the network interfaces, the first link state advertisement message describing a corresponding one of the connected links and specifying a first dynamic routing metric and a corresponding variation metric identifying a statistical variation of the first dynamic routing metric, the first dynamic routing metric identifying a first cost of the corresponding one connected link, the routing resource of said each router further configured for selectively originating and outputting, to the network interfaces of said each router, a second link state advertisement message describing the corresponding one connected link and that specifies an updated dynamic routing metric and the corresponding variation metric, the updated dynamic routing metric identifying an updated cost of the corresponding one connected link relative to the first cost, the second link state advertisement message selectively generated by the routing resource in response to one of: (1) the routing resource having determined that the updated dynamic routing metric differs from the first dynamic routing metric by more than the variation metric, or (2) the routing resource having received the third link state advertisement message.

18. The network of claim 17, wherein the first dynamic routing metric and the updated dynamic routing metric specify a corresponding statistical normalization of the first cost and the updated cost, respectively.

19. The network of claim 18, wherein the first cost and the updated cost identify at least one of available bandwidth, utilized bandwidth, link congestion, or round trip link delay.

20. The network of claim 18, wherein the statistical normalization is one of a mean or a median of the corresponding cost relative to a prescribed distribution.

21. The network of claim 20, wherein the statistical normalization is based on an independent variable within the network, the statistical normalization providing a graph of the prescribed distribution relative to the independent variable.

22. The network of claim 21, wherein the variation metric specifies one of a percentage deviation or a standard deviation value relative to the statistical normalization.

23. The network of claim 17, wherein the routing resource is configured for selectively outputting the second link state advertisement message only in response to said one of (1) the updated dynamic routing metric differing from the first dynamic routing metric by more than the variation metric, or (2) the router having received another link state advertisement message from another router in the network, the routing resource further configured for:
periodically outputting a hello message to the another router; and
recalculating stored routes in response to the third link state advertisement message.

24. The router of claim 17, wherein the routing resource is configured for selecting a path for a received packet based on a cost value derived from the updated dynamic routing metric and the corresponding variation metric.

25. A router in a network, the router comprising:
a plurality of network interfaces, each configured for outputting, via a corresponding connected link, first and second link state advertisement messages having been generated by the router, at least one of the network interfaces configured for receiving a third link state advertisement message from another router in the network; and
means for executing a prescribed link state routing protocol, the means for executing configured for originating and supplying, to the network interfaces, the first link state advertisement message describing a corresponding one of the connected links and specifying a first dynamic routing metric and a corresponding variation metric identifying a statistical variation of the first dynamic routing metric, the first dynamic routing metric identifying a first cost of the corresponding one connected link;
the means for executing selectively originating and outputting, to the network interfaces, a second link state advertisement message describing the corresponding one connected link and that specifies an updated dynamic routing metric and the corresponding variation metric, the updated dynamic routing metric identifying an updated cost of the corresponding one connected link relative to the first cost, the second link state advertisement message selectively generated by the means for executing in response to one of: (1) the means for executing having determined that the updated dynamic routing metric differs from the first dynamic routing metric by more than the variation metric, or (2) the means for executing having received the third link state advertisement message.

26. The router of claim 25, wherein the first dynamic routing metric and the updated dynamic routing metric specify a corresponding statistical normalization of the first cost and the updated cost, respectively.

27. The router of claim 26, wherein the first cost and the updated cost identify at least one of available bandwidth, utilized bandwidth, link congestion, or round trip link delay.

28. The router of claim 26, wherein the statistical normalization is one of a mean or a median of the corresponding cost relative to a prescribed distribution.

29. The router of claim 28, wherein the statistical normalization is based on an independent variable within the network, the statistical normalization providing a graph of the prescribed distribution relative to the independent variable.

30. The router of claim 29, wherein the variation metric specifies one of a percentage deviation or a standard deviation value relative to the statistical normalization.

31. The router of claim 25, wherein the means for executing is configured for selectively outputting the second link state advertisement message only in response to said one of (1) the updated dynamic routing metric differing from the first dynamic routing metric by more than the variation metric, or (2) the router having received another link state advertisement message from another router in the network, the means for executing further configured for:
  periodically outputting a hello message to the another router; and
  recalculating stored routes in response to the third link state advertisement message.

32. The router of claim 25, wherein the means for executing is configured for selecting a path for a received packet based on a cost value derived from the updated dynamic routing metric and the corresponding variation metric.

33. A computer readable medium having stored thereon sequences of instructions for a router executing a prescribed link state routing protocol in a network, the sequences of instructions including instructions for:
  originating and outputting by the router a first link state advertisement message describing a connected link of the router in the network, the first link state advertisement message specifying a first dynamic routing metric and a corresponding variation metric identifying a statistical variation of the first dynamic routing metric, the first dynamic routing metric identifying a first cost of the connected link;
  selectively originating and outputting a second link state advertisement message describing the connected link and that specifies an updated dynamic routing metric and the corresponding variation metric, the updated dynamic routing metric identifying an updated cost of the connected link relative to the first cost, the second link state advertisement message selectively output by the router in response to one of: (1) the updated dynamic routing metric differing from the first dynamic routing metric by more than the variation metric, or (2) the router having received another link state advertisement message from another router in the network.

34. The medium of claim 33, wherein the first dynamic routing metric and the updated dynamic routing metric specify a corresponding statistical normalization of the first cost and the updated cost, respectively.

35. The medium of claim 33, wherein the selectively outputting includes outputting the second link state advertisement message only in response to said one of (1) the updated dynamic routing metric differing from the first dynamic routing metric by more than the variation metric, or (2) the router having received another link state advertisement message from another router in the network, the medium further comprising instructions for:
  periodically outputting a hello message to the another router; and
  recalculating stored routes in response to the another link state advertisement message.

36. The method of claim 1, wherein the selectively originating includes the router not outputting the second link state advertisement message if the updated routing metric differs from the first dynamic metric by less than the variation metric and the router has not received said another link state advertisement message.

37. The router of claim 9, wherein the routing resource is configured for not outputting the second link state advertisement message if the updated routing metric differs from the first dynamic metric by less than the variation metric, and if the routing resource has not received the third link state advertisement message.

38. The network of claim 17, wherein the routing resource is configured for not outputting the second link state advertisement message if the updated routing metric differs from the first dynamic metric by less than the variation metric, and if the routing resource has not received the third link state advertisement message.

39. The router of claim 25, wherein the means for executing is configured for not outputting the second link state advertisement message if the updated routing metric differs from the first dynamic metric by less than the variation metric, and if the routing resource has not received the third link state advertisement message.

40. The medium of claim 33, wherein the selectively originating includes the router not outputting the second link state advertisement message if the updated routing metric differs from the first dynamic metric by less than the variation metric and the router has not received said another link state advertisement message.

* * * * *